United States Patent
Johnson et al.

[15] 3,704,070
[45] Nov. 28, 1972

[54] DIRECTION DETERMINING SYSTEM

[72] Inventors: Philip M. Johnson, Windham; Wilfried G. Dudevoir; Richard M. Northrup, both of Nashua, all of N.H.

[73] Assignee: Sanders Associates, Inc., Nashua, N.H.

[22] Filed: May 24, 1971

[21] Appl. No.: 146,392

[52] U.S. Cl. ....................356/152, 340/25, 340/29, 250/199
[51] Int. Cl. ..........................G01b 11/26, H04b 9/00
[58] Field of Search ............356/152; 340/25, 29, 82; 250/199

[56] References Cited

UNITED STATES PATENTS

| | | |
|---|---|---|
| 3,662,180 | 5/1972 | Jorgensen..................356/152 |
| 3,648,229 | 3/1972 | Burrows......................340/26 |

Primary Examiner—Samuel Feinberg
Assistant Examiner—S. C. Buczinski
Attorney—Louis Etlinger

[57] ABSTRACT

A system is described in which a plurality of energy sources sequentially project segments of a directional code to a predetermined sector of space. An observer within the sector determines the angle between a reference direction and his line of sight to the system by noting the sequence and timing of the energy pulses he receives as successive segments are projected.

20 Claims, 6 Drawing Figures

INVENTORS
PHILIP M. JOHNSON
RICHARD M. NORTHRUP
WILFRID G. DUDEVOIR

BY W. L. Hunter

ATTORNEY

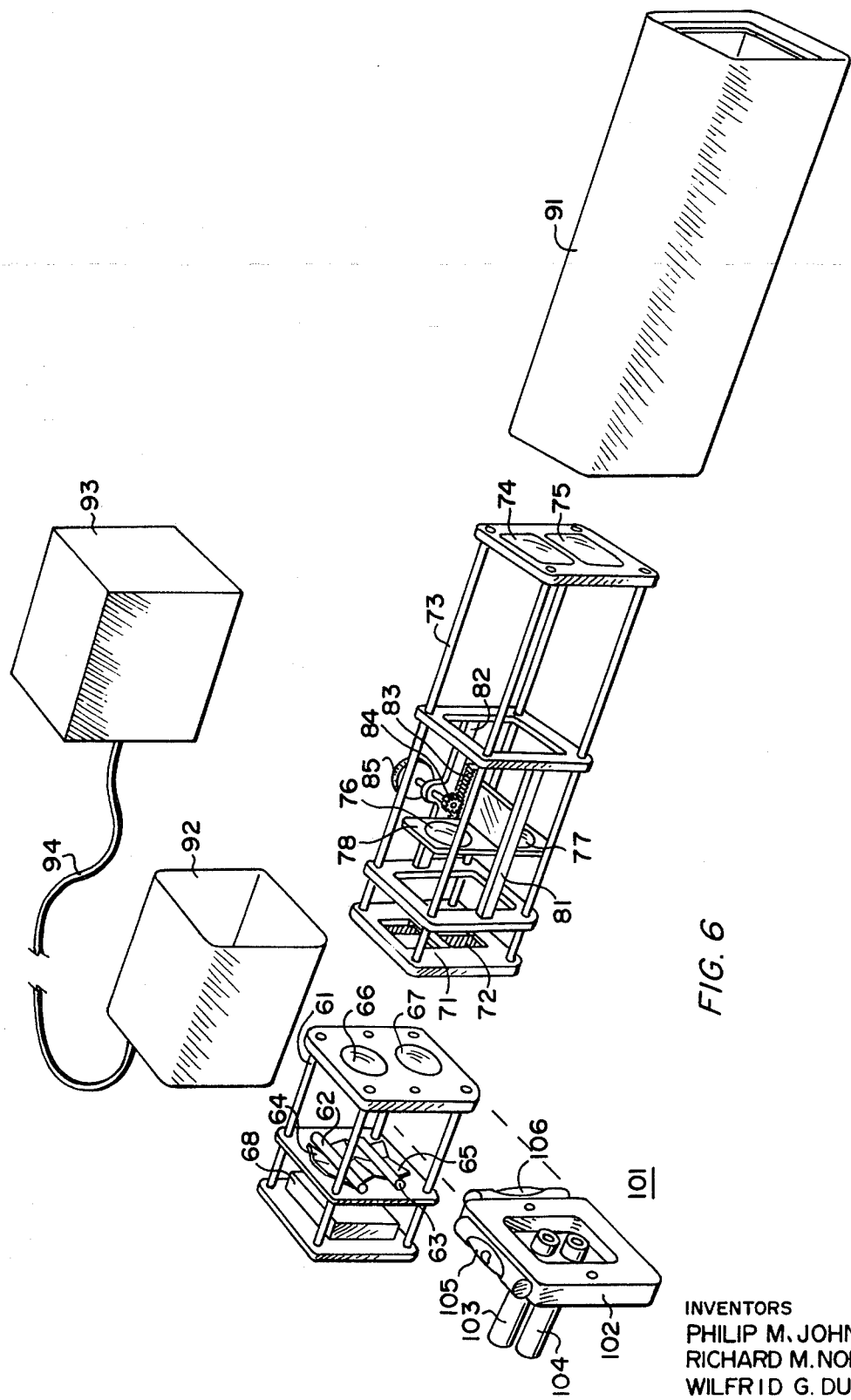

DIRECTION DETERMINING SYSTEM

CROSS REFERENCE TO RELATED APPLICATION

This application describes subject matter similar to that described in the copending application Ser. No. 877,333 filed Nov. 17, 1969, now U.S. Pat. No. 3,662,180, and assigned to the same assignee as is the instant application.

BACKGROUND OF THE INVENTION

1. Field of the Invention

This invention relates generally to direction determining systems and particularly to such systems which enable an observer at a remote location to determine his direction relative to a reference direction through a fixed location.

2. Description of the Prior Art

One frequent use for systems of the general kind noted above has been to aid the pilot of an aircraft in his approach to a landing strip. Various devices for this purpose have been proposed. In one arrangement, three or more fan shaped beams of different colored lights are projected, from which the pilot may observe, either with his unaided eye or by means of various receivers, which color of beam he is in, thereby informing him whether he is on the preferred path or displaced therefrom to one side or the other. In other systems, many lights are projected in narrow beams so directed that only certain lights are visible when the pilot is on the correct path while others are visible as he deviates from that path. From the pilot's viewpoint, a single light appears to move to one or the other side of a reference as he departs from the optimum path. However, the present invention more nearly resembles, and is an improvement over, the system described in the aforementioned copending application, Ser. No. 877,333. Briefly stated, that application describes a system in which a cylindrical mask is formed with transparent and opaque areas arranged in a binary code such as the Gray code. The mask is rotated about a lamp on its axis in such a way as to bring segments of the code successively into operative relation with a projection lens so that these segments are projected successively into space. An observer may determine his angular relation to a reference plane through the system by noting the sequence and timing of the pulses of light he receives.

The arrangement of application Ser. No. 877,333 although entirely satisfactory for many purposes, has certain limitations. For example, the necessity for moving parts to rotate the mask not only limits the speed of operation but imposes obvious disadvantages from the standpoint of maintenance and useful life. As another example, the range and the number of resolution elements which can be used effectively are limited by the size and power of the light source, which can be increased conveniently only up to a certain point. Additionally, the speed of operation is limited by the frequency at which the light source can be pulsed at any given peak power.

OBJECTS OF THE INVENTION

It is a general object of the present invention to provide an improved direction determining system.

Another object of the invention is to provide a direction determining system of the kind mentioned above which is capable of operating over a greater range, with higher resolution and at a higher speed.

SUMMARY OF THE INVENTION

Briefly stated, a system incorporating the invention includes a plurality of masks, energy sources and projections systems. Each mask represents one segment of a code. The sources are activated sequentially to project patterns, determined by these segments, successively to substantially the same sector of space. An observer within this sector determines his angular relation to a reference plane by noting the sequence and timing of the energy pulses received. The use of a plurality of energy sources enables this system to utilize greater average power and therefore to exhibit greater peak power per pulse or faster data transmission or to utilize more resolution elements or combinations thereof.

BRIEF DESCRIPTION OF THE DRAWING

For a clearer understanding of the invention, reference may be made to the following detailed description and the accompanying drawing, in which:

FIG. 6 is an exploded perspective view of another embodiment of the invention.

DESCRIPTION OF PREFERRED EMBODIMENTS

Figure 1:
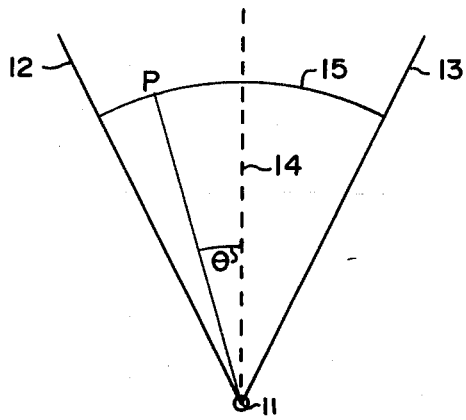
FIG. 1 is a diagram useful in explaining the invention.

Referring first to FIG. 1, there is shown the location of a transmitter 11, which directs energy into a predetermined sector of space, shown as bounded by the lines 12 and 13, in such a way as to enable an observer at any point P within the sector to determine his angular position with respect to a reference direction 14 passing through the transmitter 11. The reference direction is a plane passing through the transmitter 11 perpendicular to the plane of the paper and may be established anywhere within or without the sector but is shown for illustrative purposes as passing through the center of the sector. FIG. 1 may be regarded as either a plan or an elevation view but will be assumed for descriptive purposes to be a plan view so that $\theta$ is a horizontal angle measured between two intersecting vertical planes.

Figure 2:
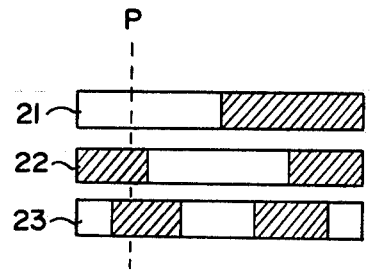
FIG. 2 is a schematic diagram of a code and is useful in explaining the invention.

The transmitter 11 may operate with radiant or electromagnetic or acoustic energy of any frequency capable of being transmitted with suitable directivity characteristics. For illustrative purposes light energy will be assumed. The light is transmitted in a series of pulses, preferably starting with an initial, uncoded light pulse transmitted to the entire sector so as to alert all observers that coded pulses are to follow. Thereafter, each pulse transmits one spatially coded pattern which is one segment of a binary code, such as the simplified three segment code shown in FIG. 2. The first coded pulse transmits a light pattern corresponding to segment 21 which illuminates the entire left side of the sector, leaving the right side dark. The next coded pulse illuminates the sector in a pattern determined by the segment 22 and the third coded pulse projects a pattern corresponding to segment 23. Each pattern is uniform in the vertical direction and extends through a vertical angle sufficient to include the location of all prospective observers. It is apparent that the pulse pattern "light-dark-dark" is unique, within the limits of resolution of the apparatus, for the vehicle plane containing the observer's line of sight from the point P to the transmitter 11. It is also apparent that the angle $\theta$ between this plane and the reference direction 14 is measured by the unique pattern. For any particular system, the pattern can be calibrated to represent numerical values of the angle $\theta$.

Figure 3:
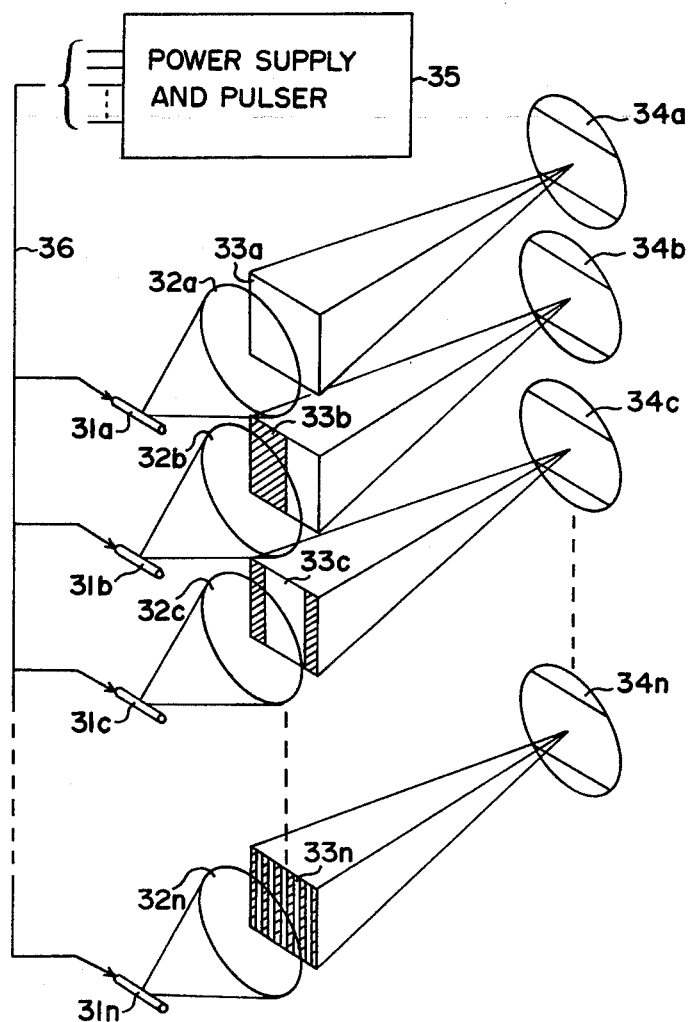
FIG. 3 is a schematic diagram of a transmitter in accordance with the invention.

A preferred embodiment is illustrated in FIG. 3 wherein there are shown a plurality of light sources 31a, 31b, 31c..., 31n such as xenon flash tubes; a like plurality of condensing lenses 32a, 32b, 32c... 32n for condensing the light from the flash tubes onto corresponding masks 33a, 33b, 33c... 33n so as to illuminate them uniformly. The mask 33a is entirely transparent (or could be omitted) while each of the other masks comprises opaque and transparent areas, shown as cross hatched and clear respectively, each arranged as one segment of a binary code. Lenses 34a, 34b, 34c... 34n are positioned to project the patterns defined by their associated masks into a predetermined sector of space. The angular dimensions of this sector are determined by the parameters of the lenses 34, each of which preferably comprises several elements with adjustments to enable them to be made optically substantially identical so that the various patterns are projected into substantially the same sector. Assuming that angular measurement is to be made in the horizontal direction, the masks and their associated optics are preferably positioned closely adjacent to and directly above one another as shown so that the small amount of parallax caused by their displacement will appear in the vertical direction and therefore will not affect the measurement. In most applications, the displacements are so small compared to the dimensions of the illuminated sector that the parallax would be negligable even if the units were arranged horizontally.

A power supply and pulser 35 is provided to energize the tubes 31 one at a time in any predetermined sequence. Preferably the tube 31a is pulsed first so that all observers in the sector may know just when coded pulses are to occur. The duration of spacing between pulses is selected with due consideration for various factors such as the area and range of operation, the permissible peak and average power of each flash tube, the speed and frequency of transmission necessary and the nature of the receiver which may be the unaided human eye or a sophisticated electronic system.

Figure 4:
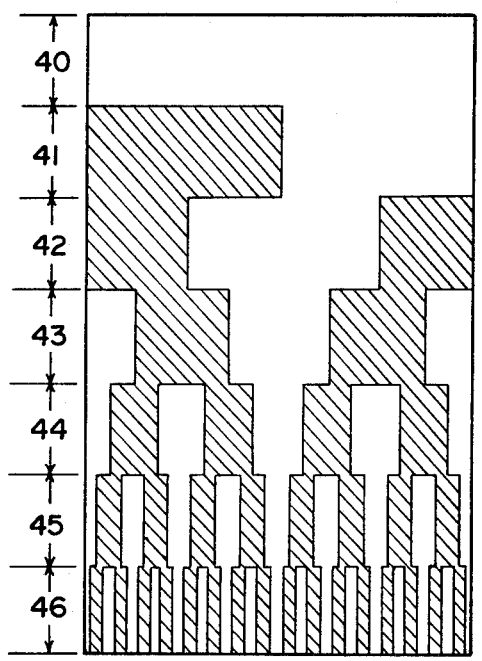
FIG. 4 is a schematic diagram showing one form of binary code suitable for use in the transmitter of FIG. 3.

The number of optical units, that is, assemblies comprising a light source 31, condensing lens 32, mask 33 and projection lens systems 34, will depend upon the resolution required and the code used. One suitable code is the modified Gray code of FIG. 4 which comprises an entirely clear segment 40 and as many coded segments as required, six segments, 41 to 46 inclusive, being shown for illustrative purposes. This code, although not the only one which may be used, is particularly suitable because as one goes from one sector area to the next there is never more than one transition and that transition occurs in the least significant digit place. For the code as illustrated in FIG. 4, seven optical units would be used—one for the initial pulse and six for the coded pulses. The seven masks 33a–33g would be formed according to the patterns of segments 40–46 respectively. Collectively they represent the entire code. This code divides the sector into 64 angularly distinguishable parts. The angular width of the sector, and of each part, may be selected by choosing appropriate projection lenses 34.

In operation, the power supply and pulser 35 is operated so as to pulse each light source in a predetermined cycle, for example, sequentially in the order in which they are shown in FIG. 3. It would be possible to make the length of each pulse and the spacing between pulses long enough so that a man could observe them with his unaided eye and determine his angular deviation from the reference direction. However, it is believed at present that the invention will find most in those applications using electronic reception and decoding, thus enabling fast operation.

Figure 5:
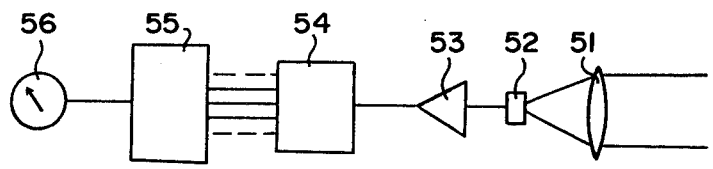
FIG. 5 is a schematic block diagram of a receiver which may be used in conjunction with the transmitter of FIG. 2.

FIG. 5 shows, in block form, one suitable receiver. A lens 51 collects the incoming energy and focuses it on a spectrally compatible photoelectric detector element 52. The electrical output of the detector 52 is coupled through an amplifier 53 to a memory 54 which records the presence or absence of energy in each interval during which pulses may be expected. The memory 54 must, of course, be designed and adjusted to accommodate pulses of the spacing and duration determined by the pulser 35. The outputs of the memory 54 are coupled to a decoder 55 wherein the binary coded information may be converted to analog or digital information indicative of the numerical value of the angle $\theta$ between the observer's line of sight to the transmitter and the reference direction. Any suitable readout device may be used, a simple meter 56 being shown for illustrative purposes.

Another preferred embodiment of the invention is illustrated in FIG. 6 wherein there is shown a framework 61 on an intermediate portion of which are mounted two light sources 62 and 63 such as xenon flash tubes. They are provided with reflectors 64 and 65 respectively for concentrating the light energy on condensing lenses 66 and 67 respectively, mounted on the forward part of the framework 61. High voltage triggering equipment 68 is mounted near the rear of the framework, just behind the light sources 62 and 63.

A pair of masks, or reticles, 71 and 72, are mounted at the rear of another framework 73 in such position as to be illuminated by light from the lenses 66 and 67 respectively. The source 62, reflector 64, lens 66 and mask 71 are positioned directly above the source 63, reflector 65, lens 67 and mask 72 respectively. The right half of the mask 71 (as viewed from the light source) is transparent while the left half is opaque. Conversely, the right half of the mask 72 is opaque while the left half is transparent. That is, the patterns on the two reticles are mirror images of each other. In each case, the division between halves is a sharp, straight line. A pair of projection lenses 74 and 75 are mounted at the forward end of the framework 73 and are positioned to project images of the masks 71 and 72 into substantially the same sector of space. The positions of the masks are normally adjusted to superimpose the two lines of division so that the upper optical unit (source, reflector, mask and lens) illuminates the field to the right of a sharp line through the middle of the sector while the lower optical unit illuminates the field to the left of the same line.

Auxiliary lenses 76 and 77 are provided to focus the lenses 74 and 75, as will be more fully discussed. The lenses 76 and 77 are mounted on a sub-frame 78 which in turn is mounted to be slideable along tracks 81 and 82 toward and away from the lenses 74 and 75. The tracks 81 and 82 are mounted on the framework 73. The subframe 78 includes a rack 83 which cooperates with a pinion 84 rotatably mounted on the framework 73 and provided with a focusing knob 85. The lenses 74 and 76 constitute a first projection lens system while the lenses 75 and 77 constitute a second such system.

In normal use, the two frameworks 61 and 73 are brought together and fastened. They are enclosed by a cover having a forward section 91 and a rear section 92. An external power supply and pulser 93 is connected by means of a cable 94 through the rear section 92 to the triggering equipment 68 and the light sources 62 and 63.

In operation, the two lamps are pulsed alternately according to a code such as a single pulse for the upper lamp and a double pulse for the lower lamp. Thus visual decoding is rapid and simple, whether done with the human eye or with electro-optical equipment. An observer to the right of the center line (as viewed from the projection equipment) will see a single flash while an observer to the left will see a double flash. He may find the separator lines by looking for the positions where either the single or the double flash just begins to disappear. The center portion, where both single and double flashes are visible, can be made wide or narrow to suit various applications by adjustment of the masks 71 and 72. For applications in which high accuracy location is desired, the center portion is made narrow and electro-optical detection is used to measure the relative amplitudes of the single and double flashes. For some applications, such as channel navigation guidance, the masks may be adjusted so that the lines of division are laterally displaced slightly from each other so that both upper and lower units illuminate a common narrow sector in the center of the field. In this way, three sharply defined sectors are produced, the center sector defining the safe navigational channel.

The frameworks 61 and 73 are made to be readily attachable to and detachable from each other. The rear section 92 of the cover and the framework 61 may be detached and replaced with an eyepiece, indicated generally by the reference character 101. The eyepiece 101 comprises a generally rectangular auxiliary frame 102 on which are mounted viewing microscopes 103 and 104 positioned to view the reticles 71 and 72, respectively. Two level vials 105 and 106 are mounted on adjacent, orthogonally related portions of the frame 102. In use, the viewing microscopes are first focused on the reticles and then the lenses 76 and 77 are adjusted in position by means of the knob 85 to focus the image of the field of view on the reticles. Thus the projection lenses 74, 75, 76 and 77 function as the objective lenses of a pair of telescopes, enabling the operator to see an image of the field of view superimposed on the sharp division lines of the reticles. The reticles may thus be adjusted to align the two division lines or to separate them, in either sense, to suit the particular job requirements.

One model of the specific embodiment described above used a housing having external dimensions of approximately 3 inches by 3 and ½ inches by 14 inches (exclusive of the power supply). This model, when used with electronic detection, was found to have a useful range of better than 2 miles, and an angular accuracy of better than 10 seconds of arc.

The embodiments of both FIGS. 3 and 6 can be used to determine directions in more than one plane and/or to cover more than one sector simply by providing additional transmitters suitably oriented. Both embodiments have been described as using reticles comprised of alternately arranged transparent and opaque areas which is the arrangement preferred at present. However, the principles would remain the same using other kinds of reticles, provided they were comprised of areas differentially responsive to incident energy. In addition to reticles with opaque and transparent areas, examples are reticles with reflective and absorptive areas or with reflective and transmissive areas. The important thing is that the masks be capable of defining patterns in which energy is either present or absent.

From the foregoing it will be apparent that applicants have provided an improved direction determining system. The actual numerical value of the angular deviation is determined. No moving parts are used. The use of a plurality of lamps allows a corresponding increase in the average power emitted when the power limitation is the allowable heat dissipation of the light source. The greater average power allowance may be applied to a faster data rate, a greater number of resolution elements, greater peak power per pulse, or combinations of these.

Although specific embodiments of the invention have been described in considerable detail for illustrative purposes, many modifications will occur to those skilled in the art. It is therefore desired that the protection afforded by Letters Patent be limited only by the true scope of the appended claims.

What is claimed is:

1. A transmitter for providing an observer at a remote location in a predetermined sector of space with an indication of the angle between his line of sight to the transmitter and a reference direction through the transmitter, comprising, a plurality of energy sources, a like plurality of masks, each comprising a different pattern of alternately arranged areas differentially responsive to the incidence of energy from said sources and each positioned to be illuminated by one of said sources, said areas being positioned on said masks so that the pattern of each represents one segment of a code while the patterns on all masks collectively represent a complete code indicative of deviation from said reference direction, a like plurality of means each for projecting light from one of said sources, in a pattern defined by its associated mask, into said sector, and means for pulsing said sources in accordance with a predetermined cycle, whereby the sequence and timing of the energy pulses observed at any location within said sector are indicative of said angle.

2. A transmitter in accordance with claim 1 in which said energy sources are light sources and said means for projecting are optical means.

3. A transmitter in accordance with claim 1 which includes at least three energy sources, three masks and three means for projecting.

4. A transmitter in accordance with claim 1 in which the patterns on said masks are comprised of areas which are alternately transparent and opaque to the energy of said sources.

5. A transmitter in accordance with claim 1 in which said plurality is two and in which said masks each comprise two equal areas, one transparent and one opaque, divided by a sharp straight line.

6. A transmitter in accordance with claim 5 in which the areas of said masks define patterns which are mirror images of each other 7. A transmitter for providing an observer at a remote location in a predetermined sector of space with information from which he can obtain a measure of the angle between his line of sight to the transmitter and a reference plane through the transmitter comprising,
- a plurality of light sources, each comprising a lamp capable of being activated for brief periods of time,
- a like plurality of masks, each comprising a different pattern of alternately arranged areas opaque and transparent to the light from said sources,
- said areas being positioned on said masks so that the pattern on each represents one segment of a code while the patterns on all masks collectively represent a complete code indicative of deviation from said reference direction,
- a like plurality of condensing lenses each for illuminating one of said masks uniformly with light from one of said sources,
- a like plurality of projection lenses each for projecting the pattern of light and dark areas defined by one of said masks into said sector, and
- means for activating each of said sources sequentially for a brief period of time,
- whereby segments of said code are projected sequentially into said sector.

8. A transmitter in accordance with claim 7 which includes at least three sources, condensing lenses, masks and projection lenses.

9. A transmitter in accordance with claim 8 including an auxiliary light source, condensing lens, mask and projection lens in which said mask is entirely transparent.

10. A transmitter in accordance with claim 9 in which said means for activating includes means for activating said auxiliary source before the other sources are activated.

11. A transmitter for providing an observer at a remote location in a predetermined sector of space with an indication of the sense of his deviation from a reference plane through the transmitter, comprising,
- first and second frameworks, releasably attached to each other,
- first and second sources mounted adjacent to each other on said first framework,
- first and second masks mounted adjacent to each other on said second framework, each comprising two equal areas divided by a sharp straight line, one transparent and one opaque to the light from said sources,
- said masks being positioned with the dividing lines approximately aligned,
- means on said first framework for concentrating light from said first and second sources onto said first and second masks respectively,
- first and second projection lens systems mounted on said second framework for projecting patterns of light, as defined by said first and second masks respectively, into said sector of space, and
- means for pulsing said light sources one at a time in accordance with a distinguishing code,
- whereby an observer in said sector can determine from the code received whether and to which side of said reference plane he is located.

12. A transmitter in accordance with claim 11 which includes a two part cover, one part enclosing each of said frameworks and the equipment mounted thereon.

13. A transmitter in accordance with claim 11 in which said means for concentrating includes first and second reflectors and first and second lenses positioned to cooperate with said first and second sources respectively.

14. A transmitter in accordance with claim 11 in which said projection lens systems include means for adjusting the focus thereof.

15. A transmitter in accordance with claim 11 including an eyepiece selectively attachable to said framework in place of said first framework.

16. A transmitter in accordance with claim 15 in which said eyepiece includes first and second viewing microscopes for viewing simultaneously said reticles and an image of said sector of space.

17. A transmitter for providing an observer at a remote location in a predetermined sector of space with an indication of the sense of his deviation from a reference plane through the transmitter, comprising
- a first framework,
- first and second light sources mounted adjacent to each other on said framework,
- first and second means mounted on said first framework for concentrating and condensing light from said first and second sources, respectively;
- a power supply and pulser electrically connected to said light sources,
- a second framework,
- first and second masks mounted adjacent to each other on said second framework, each comprising two equal areas divided by a sharp straight line, one transparent and one opaque to light from said sources, said masks being positioned with the dividing lines approximately aligned,
- first and second projection lens systems mounted on said second framework for projecting light into said sector of space,
- an auxiliary frame, and
- first and second viewing microscopes mounted on said auxiliary frame, said first and second frameworks and said auxiliary frame including means enabling the selective attachment of either said first framework or said auxiliary frame to said second framework, such that with said first framework attached to said second framework, light from said source is concentrated and condensed onto said masks and patterns of light as determined by said masks are projected into said sector of space and such that with said auxiliary frame attached to said second framework, an operator can observe and adjust the apparatus on said second framework.

18. A transmitter in accordance with claim 17 in which said projection lens system includes means for adjusting the focus thereof.

19. A transmitter in accordance with claim 17 in which said power supply and pulser includes means for pulsing said light sources one at a time in accordance with a predetermined code.

20. A transmitter in accordance with claim 17 which includes first and second leveling vials mounted on said auxiliary frame orthogonally to each other.

* * * * *